UNITED STATES PATENT OFFICE.

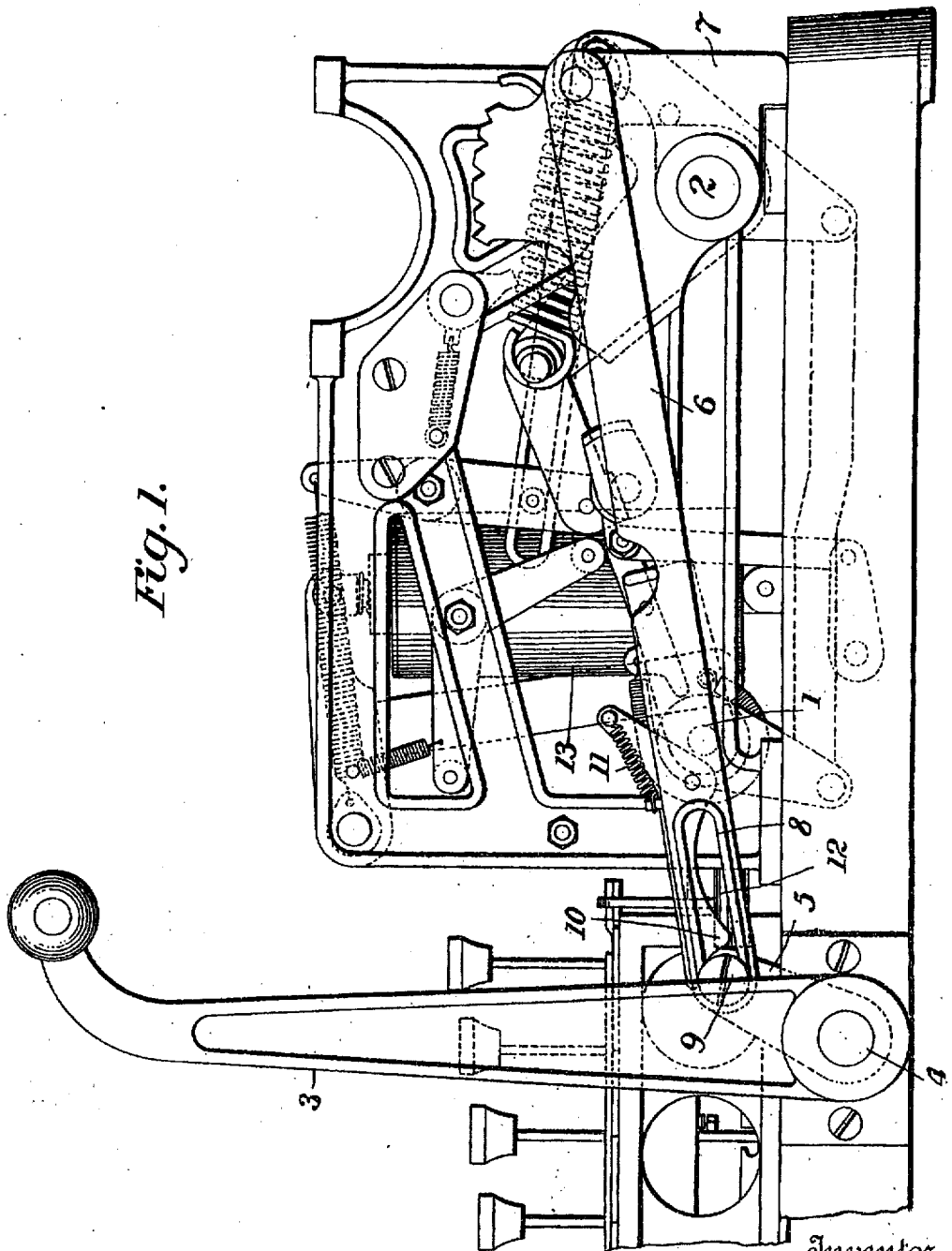

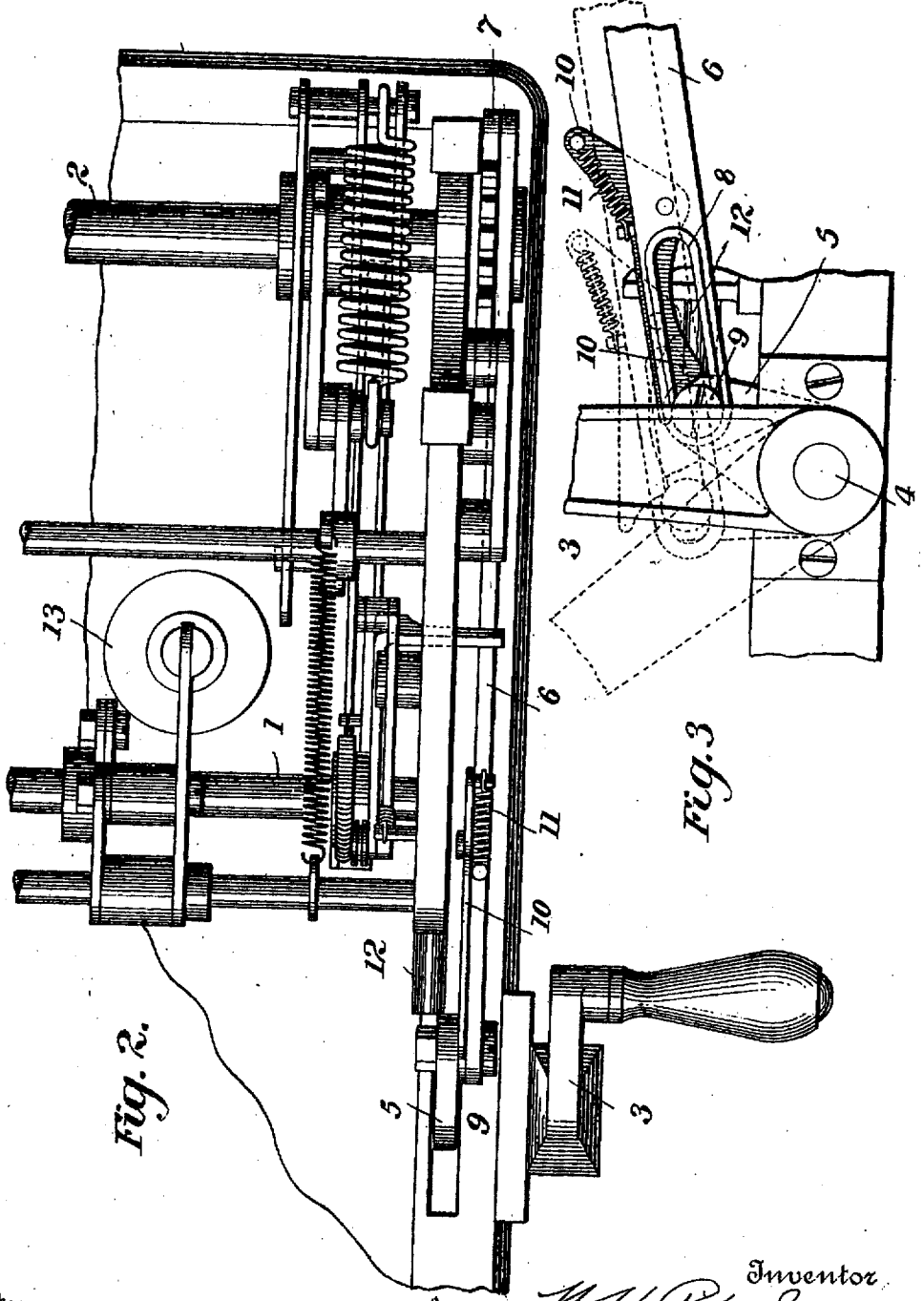

WILLIAM H. PIKE, JR., OF SOUTH ORANGE, NEW JERSEY, ASSIGNOR TO PIKE ADDING MACHINE COMPANY, OF ORANGE, NEW JERSEY, A CORPORATION OF NEW JERSEY.

HANDLE CONNECTION FOR ADDING-MACHINES.

No. 910,853.  Specification of Letters Patent.  Patented Jan. 26, 1909.

Application filed September 29, 1906. Serial No. 336,695.

*To all whom it may concern:*

Be it known that I, WILLIAM H. PIKE, Jr., a citizen of the United States, residing at South Orange, in the county of Essex and State of New Jersey, have invented certain new and useful Improvements in Handle Connections for Adding-Machines, of which the following is a specification.

The present invention relates to improvements in adding machines and particularly to means for connecting the operating handle or crank of such a machine with the parts actuated thereby.

In the accompanying drawings: Figure 1 is a side elevation of a portion of an adding machine including an embodiment of the invention; Fig. 2 is a plan view of the parts shown in Fig. 1; Fig. 3 is a detail.

For purposes of illustration the invention is shown as applied to an adding machine like that illustrated and described in U. S. Patent No. 763,692, and 1 designates the main or working shaft of the machine which is suitably connected with a parallel counter-shaft 2, that in turn is suitably connected with the operating handle or crank 3. Thus on the shaft 4 to which the crank or handle 3 is connected is carried an arm 5 which is connected, through a link 6, with an arm 7 on the countershaft 2. In addition to the parts set forth in said Letters Patent the speed of movement of the working shaft is controlled by a suitable dash pot 13, and means are provided for insuring a full movement or stroke of the parts operated from the handle 3 in either direction, said means comprising a series of teeth formed in the upper edge of the arm 7, and a dog or catch pivotally mounted in the frame of the machine and adapted to coäct with said teeth on the arm 7.

Heretofore I have made the link 6 solid, and have found that under certain conditions, when the machine is being operated very rapidly an operator will start the return movement of the handle after the serrated edge of the arm 7 has passed from beneath the dog or catch but prior to the shafts 1, 2, completing their working movements. This, through the link 6, is transmitted to the counter and working shafts and may result in disarranging or even breaking the machine. To prevent this I provide a yielding or flexible connection between one part operated by the handle, as the arm 5 on the handle shaft and one of the parts to which movement is to be imparted, as the link 6. As shown this connection is obtained by forming a slot 8 in the link 6, through which slot projects a pin or stud 9 on the arm 5.

It will be seen that normally the parts occupy the positions shown in full lines in Fig. 1 and when the handle or crank 3 is operated, or moved toward the front of the machine the pin and end of the slot are in bearing contact and the movement will be transmitted, through the pin or stud 9 and link 6, to the counter and working shafts and the machine is operated. If the return movement of the handle is properly timed with relation to the movement of the counter shaft the parts will remain in the relative positions shown in full lines in Fig. 1 throughout the operation of the machine and during the restoring of the several elements thereof to position for a second operation. If, however, the operator should start the return movement of the handle or crank before the operative movements of the counter and working shafts have been completed the handle can move in advance of the movements of the parts controlled by the dash pot and the stud 9 is no longer in bearing contact with the end of the slot but moves rearward in the latter, while the link 6 follows the movement of the stud as fast as the control devices will permit. While these parts may be used without the addition of others it is desirable to hold the handle normally in the position shown in Fig. 1 to prevent it from falling back or moving too freely independently of the link 6; and I therefore provide a suitable yielding detent for this purpose. This may be arranged in any suitable position, but, preferably, is carried by the link 6 and is in the form of a dog or lever 10, one end of which is normally in position to act as an abutment for the pin 9 and is so held by a spring 11, whereby the dog will not yield or readily change its position, but the end of the dog is beveled and the spring 11 is of such strength that the lever will yield to the thrust of the pin if the lever is pushed back by hand before the link completes its forward motion. As soon as the return movement of the counter-shaft restores the link 6 to normal position relative to the pin 9 the lever 10 will be swung by its spring 11 into the position shown in full lines in Fig. 1. The return movement of the handle or crank 3 is properly arrested by a stop 12 secured on the frame of the machine and against which the arm 5 on the handle shaft bears when it is in normal position.

The operation and advantages of the invention will be clear from the foregoing description and the drawing.

While the invention has been described as applied to an adding machine and as particularly adapted for such use it will be seen that it is adapted for use with other classes of machines adapted to be actuated by a swinging or rocking handle and including parts, operated by and connected with said handle, which may move at a different rate of speed from that imparted to the handle or crank.

What I claim, is:—

1. The combination of a shaft, an operating handle connected fixedly therewith, a working shaft, and connections between the two shafts having bearings arranged to make contact to insure the movement of one shaft with the other in moving the handle in one direction, one bearing supported to yield under pressure of the handle and to permit independent movements of the handle and connections when the handle is moved in the other direction.

2. The combination of a shaft, an operating handle connected fixedly therewith, a working shaft, connections between the two shafts having bearings arranged to make contact to insure the movement of one shaft with the other in moving the handle in one direction, but capable of separation to permit independent movements when the handle is moved in the other direction, and a detent arranged to afford a limited resistance to the said independent movement.

3. The combination of a working shaft, a swinging handle, means independent of the handle controlling the movement of the shaft and connections between the handle and shaft including a slotted link and a pin moving with the handle and extending into the slot in said link and a yielding bearing for said pin carried by the link, whereby the shaft will be positively rocked in one direction by swinging the handle but the latter under pressure may move in the opposite direction without operating said link.

4. The combination of a working shaft, a swinging handle, means independent of the handle controlling the movement of the shaft, and connections between the handle and shaft including a slotted link connected with the shaft, a pin movable with the handle and extending into the slot in said link, and a pivotally mounted abutment carried by the link and normally engaging said pin, substantially as and for the purpose described.

5. The combination of a working shaft, a swinging handle, means independent of the handle controlling the movement of the shaft, and connections between the handle and shaft including a slotted link connected with the shaft, a pin movable with the handle and extending into the slot in said link, and a pivotally mounted spring actuated abutment carried by the link and normally engaging said pin, substantially as and for the purpose described.

6. The combination in an adding machine, of a working shaft, a counter-shaft connected to move in unison with the working shaft, a swinging handle, means independent of the handle controlling the speed of movement of said shafts, and connections between the counter shaft and handle, including a yielding member, whereby said shafts will be positively moved in one direction by swinging the handle but the latter may be moved in a reverse direction against the resistance of the yielding member but is normally held in position by the latter.

7. The combination of a working shaft and means for limiting its speed of rotation, an operating shaft and handle connected fixedly therewith, and devices including a link intermediate the two shafts for communicating movement from the handle shaft to the working shaft, said devices constructed to normally preserve the relation of the handle and link but to yield under the movement of the handle shaft in one direction at a speed in excess of that of the working shaft.

In testimony whereof I affix my signature in presence of two witnesses.

WILLIAM H. PIKE, Jr.

Witnesses:
J. L. WHITE,
E. G. LANGHORNE.